United States Patent
Armstrong et al.

(10) Patent No.: US 10,364,037 B2
(45) Date of Patent: Jul. 30, 2019

(54) OPTIONALLY HYBRID POWER SYSTEM

(71) Applicants: Rolls-Royce Corporation, Indianapolis, IN (US); Rolls-Royce North American Technologies, Inc., Indianapolis, IN (US)

(72) Inventors: Michael James Armstrong, Avon, IN (US); Richard K. Keller, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 201 days.

(21) Appl. No.: 15/440,480

(22) Filed: Feb. 23, 2017

(65) Prior Publication Data

US 2017/0320585 A1    Nov. 9, 2017

Related U.S. Application Data

(60) Provisional application No. 62/332,562, filed on May 6, 2016.

(51) Int. Cl.
*F02C 7/32* (2006.01)
*B64D 27/02* (2006.01)
(Continued)

(52) U.S. Cl.
CPC ............ *B64D 31/00* (2013.01); *B64D 27/10* (2013.01); *B64D 27/24* (2013.01); *B64D 31/06* (2013.01);
(Continued)

(58) Field of Classification Search
CPC ........ B64D 31/00; B64D 27/10; B64D 31/06; B64D 27/24; B64D 2027/026; F02C 7/32;
(Continued)

(56) References Cited

U.S. PATENT DOCUMENTS 6,308,639 B1    10/2001  Donnelly et al.
7,327,048 B2    2/2008   Xu et al.
(Continued)

FOREIGN PATENT DOCUMENTS

DE    102012021339 A1    4/2014
DE    102013209538 A1    11/2014
(Continued)

OTHER PUBLICATIONS

Extended Search Report from counterpart European Application No. 17165977.4, dated Sep. 5, 2017, 6 pp.
(Continued)

*Primary Examiner* — Russell Frejd
(74) *Attorney, Agent, or Firm* — Shumaker & Sieffert, P.A.

(57) ABSTRACT

The disclosure is directed to an optionally hybrid power system that may operate either as a traditional power system, deriving power from a single power source, or as a hybrid power system, deriving power from multiple types of power sources. An example optionally hybrid power system may include a gas turbine engine and one or more electric motors. When configured as a traditional power system the optionally hybrid power system may derive all power from the gas turbine engine. However, when configured as a hybrid power system, the one or more motors may be coupled to the optionally hybrid power system to supplement the power produced by the gas turbine engine. Additionally, an operator interface that may control the optionally hybrid power system may select from a plurality of operating modes that depend on the configuration of the optionally hybrid power system.

20 Claims, 5 Drawing Sheets

(51) Int. Cl.
*B64D 27/10* (2006.01)
*B64D 27/24* (2006.01)
*B64D 31/00* (2006.01)
*B64D 31/06* (2006.01)

(52) U.S. Cl.
CPC .......... *F02C 7/32* (2013.01); *B64D 2027/026* (2013.01); *Y02T 50/44* (2013.01); *Y02T 50/64* (2013.01); *Y10S 903/905* (2013.01); *Y10S 903/93* (2013.01)

(58) Field of Classification Search
CPC ........ Y02T 50/44; Y02T 50/64; Y10S 903/93; Y10S 903/905
See application file for complete search history.

(56) References Cited

U.S. PATENT DOCUMENTS

| | | | |
|---|---|---|---|
| 8,365,510 | B2 | 2/2013 | Lugg |
| 8,432,048 | B1 | 4/2013 | Paulino |
| 8,468,835 | B2 | 6/2013 | DeMoss et al. |
| 8,552,575 | B2 | 10/2013 | Teets et al. |
| 8,727,271 | B2 | 5/2014 | Salyer |
| 8,757,542 | B2 | 6/2014 | Hopdjanian et al. |
| 9,212,625 | B2 | 12/2015 | Shelley |
| 2012/0119020 | A1* | 5/2012 | Burns ............ B64D 27/00 244/58 |
| 2012/0153076 | A1* | 6/2012 | Burns ............ B64D 27/16 244/58 |
| 2012/0216549 | A1* | 8/2012 | Burns ............ B64D 35/00 60/786 |
| 2013/0139515 | A1 | 6/2013 | Schlak |
| 2015/0100181 | A1* | 4/2015 | Strauss ............ B64D 35/00 701/3 |
| 2015/0144742 | A1* | 5/2015 | Moxon ............ B64D 27/12 244/215 |
| 2015/0285165 | A1 | 10/2015 | Steinwandel et al. |
| 2016/0083085 | A1* | 3/2016 | Strauss ............ B64D 35/00 701/3 |
| 2016/0160677 | A1* | 6/2016 | Burns ............ B64D 35/00 415/60 |

FOREIGN PATENT DOCUMENTS

| | | | |
|---|---|---|---|
| EP | 0223364 | A1 | 5/1987 |
| EP | 2404775 | A2 | 1/2012 |
| WO | 2011083369 | A1 | 7/2011 |
| WO | 2016049030 | A1 | 3/2016 |

OTHER PUBLICATIONS

Communication Pursuant to Rule 69 EPC and 70a(1) EPC, dated Nov. 13, 2017, from counterpart European Application No. 17165977.4, 2 pp.

Response to Extended European Search Report, dated Sep. 5, 2017, and Communication pursuant to Rule 69 EPC and 70a(1) EPC, dated Nov. 13, 2017, from counterpart European Application No. 17165977.4, filed May 1, 2018, 3 pp.

Correa et al., "Power Criterion for Emulating a Gas Turbine Engine with Electric Motor", Retrieved on May 3, 2016 from http://vtb.engr.sc.edu/vtbwebsite/downloads/publications/EMTS10_2_63.pdf, 6 pgs.

Correa, "Emulation of an Aeroderivative Twin-Shaft Gas Turbine Engine Using an AC Electric Motor Drive", Jan. 1, 2013, Retrieved from http://scholarcommons.sc.edu/cgi/viewcontent.cgi?article=3174&context=etd, 184 pgs.

Secunde et al., "Integrated Engine-Generator Concept for Aircraft Electric Secondary Power", NASA Technical Memorandum, Jun. 1972, 22 pgs.

Métais et al., Rolls-Royce Germany Summary of the Quiz-answers, Retrieved on May 4, 2016 from http://www.its.kit.edu/download/exkursion/2015/exkursion-2015-RR_Quiz.pdf, 9 pgs.

United States Army Aviation Warfighting Center, UH-60A Student Handout, "UH-60A T700 Engine 4743-7", Dec. 2007, 50 pgs.

MTU Aero Engine-Line replaceable units, Management of line replaceable units (LRU) and accessories, Retrieved on May 4, 2016 from http://www.mtu.de/maintenance/commercial-aircraft-engine-services/line-replaceable-units-lru-and-accessories/, 2 pgs.

Wikipedia—Accessory Drive, Retrieved on May 4, 2016 from https://en.wikipedia.org/wiki/Accessory_drive, 4 pgs.

Wikipedia—Geared Turbofan, Retrieved on May 4, 2016 from https://en.wikipedia.org/wiki/Geared_turbofan, 3 pgs.

The Econimist, Aircraft Engines—Flying's New Gear, Dec. 30, 2015, Retrieved from http://www.economist.com/news/science-and-technology/21684775-quieter-more-economical-jet-engine-fitted-gearbox-about, 5 pgs.

Limer, Popular Mechanics, 30 Years in the Making, A simple Gearbox is Posed to Change the Jet Engine, Oct. 16, 2015, Retrieved from http://www.popularmechanics.com/flight/a17813/purepower-gtf-coming-to-market/, 8 pgs.

Communication under Rule 71(3) EPC from counterpart European Application No. 17165977.4, dated May 14, 2019, 11 pgs.

\* cited by examiner

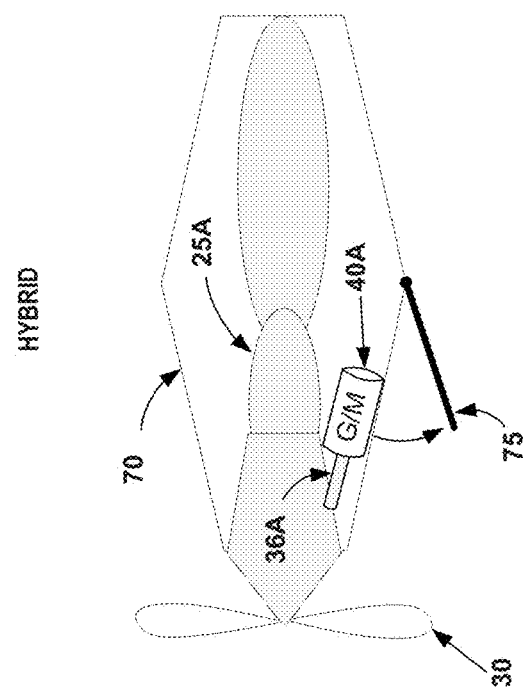
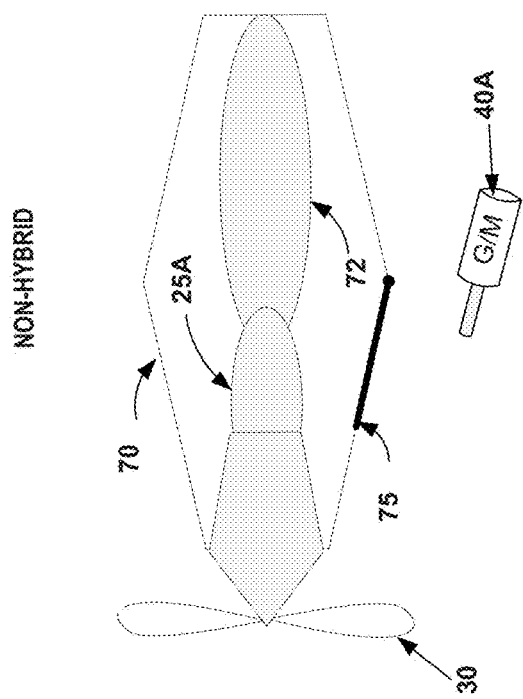
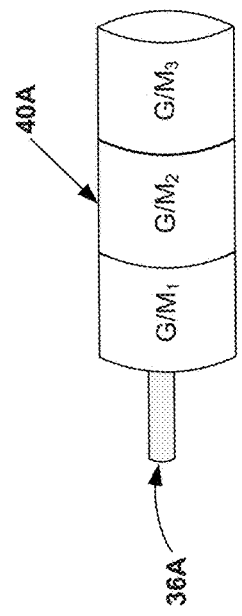
FIG. 2A
FIG. 2B
FIG. 2C

OPTIONALLY HYBRID POWER SYSTEM

This application claims the benefit of U.S. Provisional Application No. 62/332,562, filed May 6, 2016, the entire content of which is hereby incorporated by reference.

TECHNICAL FIELD

The disclosure relates to hybrid power systems that rely on both engines and electric motors and generators.

BACKGROUND

Some power systems can be described as "hybrid power systems" for deriving additional power from one or more secondary sources. For example, a hybrid aircraft may derive power (e.g., for producing thrust) from a gas turbine engine in conjunction with an electric generator and/or motor. Such a hybrid aircraft may consume less fuel and produce less engine noise as compared to a drive system on traditional aircraft, and may also benefit from additional power. However, by including multiple power sources, a hybrid power system may have a greater weight and mass as compared to non-hybrid power systems. As such, some hybrid power systems may be better suited for some operations (e.g., shorter-range aircraft missions) and may be less desirable for other operations (e.g., longer-range aircraft missions).

SUMMARY

In general, the disclosure is directed to a power system configured as an "optionally hybrid power system" that can operate as a traditional power system, deriving power from a single type of power source, and as a hybrid power system, deriving power from multiple types of power sources. An example optionally hybrid power system may include a gas turbine engine and one or more electric generator and/or motors. When configured as a traditional power system the optionally hybrid power system may derive all power from the gas turbine engine. However, when configured as a hybrid power system, the one or more generator and/or motors may be coupled to the optionally hybrid power system to provide additional power to supplement the power produced by the gas turbine engine.

In one example, the disclosure is directed to a propulsion system comprising one or more propulsors coupled to a mechanical shaft; an engine configured to drive the mechanical shaft; a removable electric machine that, when coupled to the mechanical shaft, is configured to simultaneously drive the mechanical shaft in conjunction with the engine; and a control unit configured to in response to determining that the removable electric machine is coupled to the mechanical shaft, control the engine and the removable electric machine to drive the mechanical shaft; and in response to determining that the removable electric machine is decoupled from the mechanical shaft, control only the engine to drive the mechanical shaft.

In another example, the disclosure is directed to a method comprising determining, by a control unit of a propulsion system, whether a removable electric machine of the propulsion system is coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine; in response to determining that the removable electric machine is coupled to the mechanical shaft, controlling, by the control unit, the engine and the removable electric machine to drive the mechanical shaft; and in response to determining that the removable electric machine is decoupled from the mechanical shaft, controlling, by the control unit, only the engine to drive the mechanical shaft.

In a third example, the disclosure is directed to a system comprising a means for determining, whether a removable electric machine of a propulsion system is coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine; means for determining whether the removable electric machine is coupled to the mechanical shaft; in response to determining that the removable electric machine is coupled to the mechanical shaft, means for controlling the engine and the removable electric machine to drive the mechanical shaft; in response to determining that the removable electric machine is decoupled from the mechanical shaft, means for controlling only the engine to drive the mechanical shaft.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A through 2C are conceptual diagrams illustrating portions of an example hybrid power system that enable quick removal of an electric machine, in accordance with one or more techniques of this disclosure.

DETAILED DESCRIPTION

The techniques of this disclosure may enable a power system to be configured as an "optionally hybrid power system" that can operate as a traditional power system, deriving power from a single type of power source, and as a hybrid power system, deriving power from multiple types of power sources. An example optionally hybrid power system may include a gas turbine engine and one or more electric generator and/or motors. When configured as a traditional power system, the one or more electric generator and/or motors and driver units may be decoupled from the optionally hybrid power system, in some examples even being uninstalled, thereby configuring the optionally hybrid power system to derive all power from the gas turbine engine. However, when configured as a hybrid power system, the one or more generator and/or motors are coupled to the optionally hybrid power system, in some examples requiring them to be reinstalled, to provide additional power to supplement the power produced by the gas turbine engine. Since the optionally hybrid power system is easily reconfigurable to operate as a traditional single source system or a hybrid power system, an example optionally hybrid power system may be well suited for different operations. For instance, where a hybrid power system may be better suited for some operations (e.g., shorter-range aircraft missions) and may be less desirable as compared to a traditional system for other operations (e.g., longer-range aircraft missions), an example optionally hybrid power system can quickly and easily be reconfigured based on the requirements of the operation.

Figure 1:
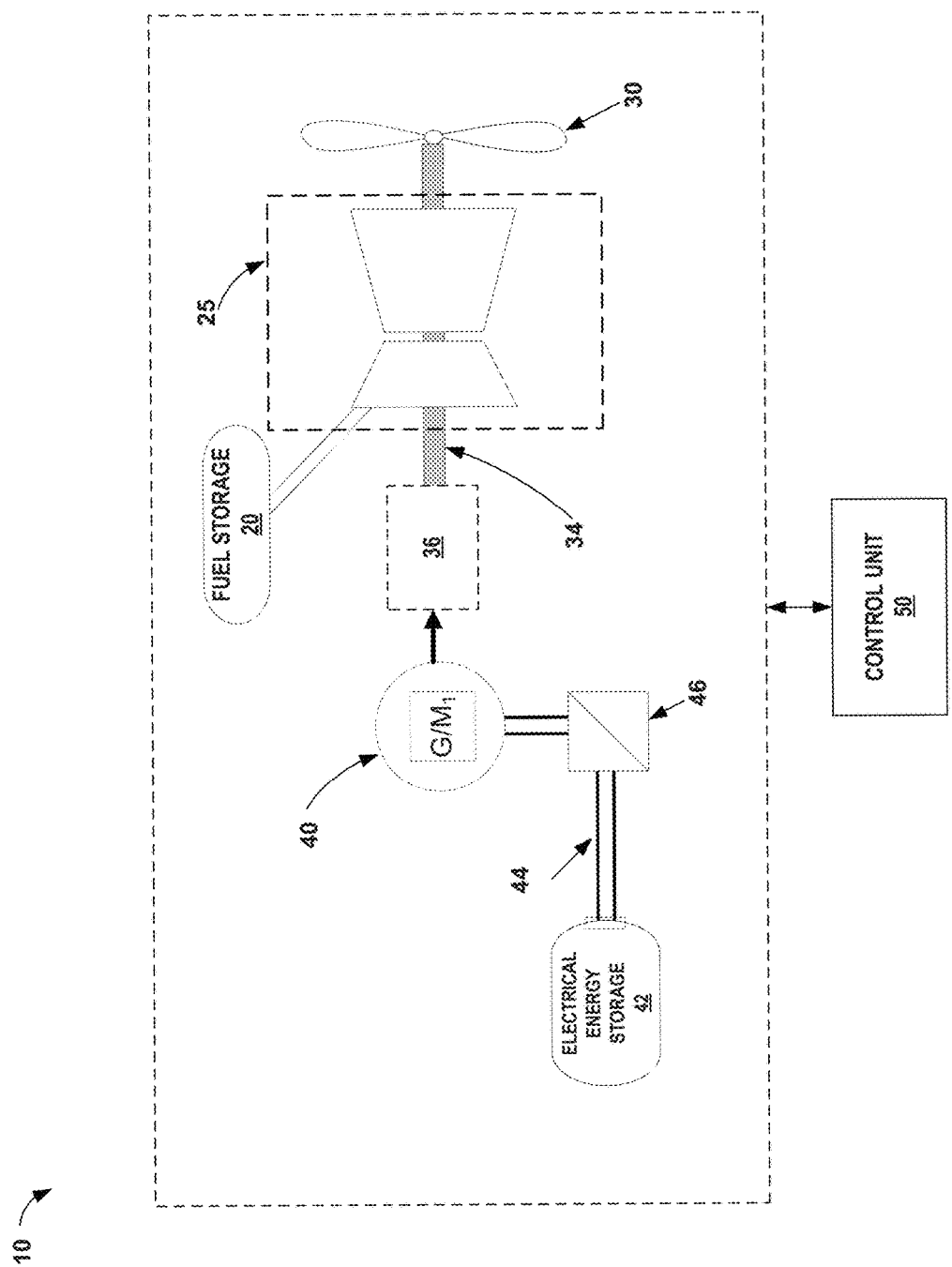
FIG. 1 is a conceptual block diagram illustrating an example hybrid power system in accordance with one or more techniques of this disclosure.

FIG. 1 is a conceptual block diagram illustrating optionally hybrid power system 10 as an example optionally hybrid power system, in accordance with one or more techniques of this disclosure. There are numerous examples of optionally hybrid power system 10. Optionally hybrid power system 10 may drive any machinery requiring rotational energy, such as a vehicle, industrial equipment, or any other system requiring rotational energy. Some examples of vehicles may include a ground vehicle, such as a train, a military tank, or an automobile. Optionally hybrid power system 10 may provide propulsion for an aircraft by driving a turbofan or a turboprop. In the example of a marine craft, optionally hybrid power system 10 may drive the main propulsion that pushes the marine craft through water and/or may drive other machinery within the marine craft, such pumps or electric generators. In other examples, optionally hybrid power system 10 may drive factory or refinery equipment such as conveyor belts, hydraulic systems and so on.

In the example of FIG. 1, optionally hybrid power system 10 (referred to simply as "hybrid power system 10" or "system 10" for short) includes fuel storage 20, engine 25, propulsor 30, transmission system 36, removable electric machine 40, removable electrical energy storage unit 42, electric power transmission connection 44, removable drive unit 46 and control unit 50. Hybrid power system 10 also includes mechanical shaft 34, which mechanically couples engine 25 to propulsor 30 and to removable electric machine 40 through transmission system 36. Hybrid power system 10 further includes control unit 50 which, as designated by the dashed-line surrounding components 20, 25, 30, 34, 36, 40, 42, and 44) may send and receive information to and from any one or more of the components of hybrid power system 10.

Hybrid power system 10 is re-configurable and can be configured to operate either in "hybrid mode" and function as a hybrid power system or in "non-hybrid mode" and function as a non-hybrid power system. When removable electric machine 40 and electrical energy storage 42 are coupled (e.g., mechanically and/or electrically) to hybrid power system 10, hybrid power system 10 is configured to operate in hybrid mode. When either electrical energy storage 42 or electric machine 40 has been de-coupled (e.g., mechanically and/or electrically) or even removed from hybrid power system 10, hybrid power system 10 is configured to operate in non-hybrid mode. For ease of description, system 10 of FIG. 1 is described primarily from the perspective of being part of an aircraft.

Mechanical shaft 34 transfers mechanical power produced by engine 25 to propulsor 30. Mechanical shaft 34 may optionally transfer mechanical power produced by engine 25 to electric machine 40 and may optionally transfer mechanical power produced by electric machine 40 to engine 25 and propulsor 30. For example, in cases where engine 25 is a gas turbine engine, mechanical shaft 34 may be a low pressure (LP) shaft of engine 25. Mechanical shaft 34 may be mechanically coupled directly to propulsor 30. In other examples, mechanical shaft 34 may be mechanically coupled to propulsor 30 via a transmission system (not shown in FIG. 1).

In some examples, system 10 includes transmission system 36 through which mechanical shaft transfers mechanical power between removable electric machine 40 and engine 25 and propulsor 30. In other examples, removable electric machine 40 may mechanically couple directly to mechanical shaft 34 without relying on transmission system 36. Transmission system 36 may also be partially removable. System 10 may provide an indication to control unit 50 whether removable electric machine 40 may couple to transmission system 36 that is coupled to mechanical shaft 34, or whether electric machine 40 may directly couple to mechanical shaft 34. In some examples, transmission system 36 may be described as a "gearbox."

Propulsor 30 may be any device that rotates to perform a function. For example, propulsor 30 may produce mechanical energy onto mechanical shaft 34 by rotating freely due to passing fluid (e.g., wind, water, or other fluid). By rotating, propulsor 30 may spin mechanical shaft 34 which may be coupled to an electric generator to generate electricity or a centrifuge, such as those found at a petroleum refinery, or other machinery. In other examples, propulsor 30 may receive mechanical energy via mechanical shaft 34 that propulsor 30 uses to perform work. For example, propulsor 30 may be a drive wheel, such as that used in a train, on a military tank, automobile or other ground vehicle that is coupled via a transmission to mechanical shaft 34. Propulsor 30 may receive mechanical energy via mechanical shaft 34 to produce movement. When system 10 is part of an aircraft, propulsor 30 may be a turbofan or a turboprop that utilizes the mechanical power derived from mechanical shaft 34 to provide thrust. When system 10 is part of a helicopter, propulsor 30 may be a rotor that utilizes the mechanical power derived from mechanical shaft 34 to produce lift. And when system 10 is part of a marine craft, propulsor 30 may include a propeller or impeller that relies on the mechanical power derived from mechanical shaft 34 to drive the marine craft through water.

In some examples, an optionally hybrid power system may include features to match an electric machine to shaft dynamics of mechanical shaft 34. These features to match shaft dynamics may function similar to an inertial emulator. For example, features may include one or more mass elements mounted to the shaft that may ensure the stability of the system. In other words, these features may function analogous to counterweights on the crankshaft of a piston engine, a flywheel, or the mass elements (e.g. lead weights) mounted on automobile tires to balance and ensure stability while rotating. Mounting mass elements is one example of technique match shaft dynamics. Other techniques, such as damping, may also match rotation dynamics and ensure system stability.

Engine 25 is the core power source for hybrid power system 10. The example of FIG. 1 depicts engine 25 as a gas turbine engine. In other examples an internal combustion engine, such as a piston or rotary engine, or other type of engine may replace engine 25 as the core power source of hybrid power system 10. Throughout this disclosure the term "engine" may refer to any engine that may use a flammable fuel source such as internal combustion engine, gas turbine engine, or other engines powered by fossil fuel, alcohol, propane or other forms of fuel. The terms electric machine, motor, electric motor, generator and electric generator may be used interchangeably throughout this disclosure because a motor may become a generator, and vice versa For convenience and clarity, this disclosure will discuss engine 25 as a gas turbine engine on an aircraft.

Engine 25 may burn flammable fuel from fuel storage 20 to produce mechanical power to rotate mechanical shaft 34. Engine 25 may provide mechanical power via mechanical shaft 34 to propulsor 30 and/or electrical machine 40. Engine 25 may also provide power via mechanical shaft 34, or a different mechanical shaft (not shown) to accessories, such as fuel pumps, hydraulic pumps and other equipment. For example, accessories, such as those listed above, may be mechanically coupled to mechanical shaft 34, or a different mechanical shaft, through an auxiliary gear box (AGB), a power take off (PTO) or a combination of a PTO and an AGB.

Electric machine 40 may be one or more machines coupled to mechanical shaft 34. In some examples, electric machine 40 may be one or more generator and/or motors used to drive mechanical shaft 34. In other examples, electric machine 40 may be any number of electric generators or alternators that are driven by mechanical shaft 34. Electric machine 40 may also be a modular combination of one or more motors and generators, described in more detail in FIG. 4. For example, electric machine 40 may be a combination of motors and or generators that may be sectioned or stacked so one or more sections may be removed or added, depending on the operational need. In the example where electric machine 40 is a motor, electric machine 40 may convert electrical energy into mechanical energy to drive mechanical shaft 34 to supplement the mechanical power provided by engine 25 to propulsor 30. In other words, removable electric machine 40 may be configured to drive mechanical shaft 34 simultaneously in conjunction with engine 25.

Electric machine 40 may be electrically coupled to and derive its electrical energy from, removable electrical energy storage unit 42 via electric power transmission connection 44. Removable electrical energy storage unit 42 may be any device that can store electrical energy. Some examples include rechargeable batteries such as lead-acid, NiMH, NiCd or similar technologies. Other examples may include hydrogen fuel cells such as alkali-based, molten carbon, proton membrane exchange (PEM) or similar electrical energy storage techniques.

Electrical energy storage unit 42 may provide electrical energy to electric machine 40 through electrical power transmission lines 44. Electrical power transmission lines 44 may be fully or partially removable, or remain part of the aircraft or other machinery that uses hybrid power system 10. Electrical power transmission lines 44 may include power electronic components to convert electrical energy from electrical storage unit 42 to a form that electric machine 40 can use.

Drive unit 46 may convert electrical energy from electrical energy storage unit 42 for use by electric machine 40. In some examples drive unit 46 may include an inverter that converts direct current (DC) energy to alternating current (AC) energy. Drive unit 46 may also be called power electronics, or a power conversion and conditioning unit. Drive unit 46 may also be removable.

During pre-flight servicing on the ground, maintenance crews may replenish the fuel supply in the aircraft fuel tanks. Similarly, maintenance crews may replenish the electrical energy in electrical energy storage unit 42. For example, during pre-flight service operations, a maintenance crew may directly connect electrical energy storage unit 42 to a ground based electrical power source for recharging. The ground based electrical power may come from any electric utility and be generated by solar, coal, geothermal, wind or other techniques. In other examples, ground maintenance crews may charge banks of electrical energy storage units and have fully charged units ready at a maintenance center to be swapped out for the discharged energy storage units. During pre-flight service, maintenance crews may remove depleted electrical energy storage unit 42 and replace it with a fully charged electrical energy storage unit, for example, by coupling electrical energy storage unit 42 to electric machine 40.

Control unit 50 may control one or more components of system 10, such as engine 25, electric machine 40 or the fuel flow from fuel storage 20. Control unit 50 may receive inputs from one or more components of hybrid system 10, such as fuel level in fuel storage 20, available electrical energy remaining from electrical energy storage unit 42 and engine temperature from engine 25. Control unit 50 may process the information received and generate commands to adjust the operation of one or more components in system 10. Control unit 50 may transmit information to an operator interface that may include engine status, fuel flow and other information. Control unit 50 may also respond to inputs coming from the operator interface. For example, in an aircraft, the operator interface may a pilot interface. A pilot may increase power for take-off, which may send inputs to control unit 50, which in turn may generate commands to increase power from engine 25 and electric machine 40.

Control unit 50 may be a processor, which may include any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. In some examples, control unit 50 may part of an engine control unit (ECU), an avionics system, or other computing device or computing system that controls operations of system 10.

In operation, control unit 50 may determine whether removable electrical energy storage unit 42 and removable electric machine 40 are coupled to hybrid power system 10. Control unit 50 may determine that removable electric machine 40 is coupled to mechanical shaft 34 by monitoring an electrical or mechanical presence sensor configured to detect the presence of electric machine 40. For example, electric machine 40 may short two electrical contacts together when electric machine 40 is bolted in place and configured to provide mechanical power to mechanical shaft 34. Control unit 50 may determine a low resistance between the electrical contacts indicating that electric machine 40 is bolted in place and coupled to mechanical shaft 34.

In response to determining that removable electric machine 40 is coupled to mechanical shaft 34 and powered by electrical energy storage unit 42, control unit 50 may simultaneously control both engine 25 and removable electric machine 40 to drive mechanical shaft 34. In one example, control unit 50 may monitor the electrical connection between removable electrical energy storage unit 42 and electric machine 40 to determine that electric machine 40 is available to power mechanical shaft 34. For an aircraft during normal cruise flight, fuel storage 20 may provide fuel to engine 25 and drive propulsor 30. Electric machine 40 may supplement the rotational energy by drawing electrical power from electric energy storage unit 42. Control unit 50 may send commands that control the fuel flow to engine 25 as well as commands that control the amount of electrical energy delivered to electric machine 40 from electrical energy storage unit 42. In this way, control unit 50 may balance the power output from engine 25 and electrical machine 40 that is delivered to mechanical shaft 34 and propulsor 30. For example, during en-route cruising for an aircraft, control unit 50 may balance the mechanical power output of electric machine 40 and engine 25 by increasing the output of electrical machine 40 and reducing the mechanical power output from engine 25 (e.g., to reduce fuel consumption by engine 25).

Control unit 50 may determine that either removable electric machine 40 is decoupled from mechanical shaft 34, or that removable electrical energy storage unit 42 is not available to supply power to electric machine 40. For example, control unit 50 may monitor the electrical connection between energy storage unit 42 and electric machine 40 and determine that there is insufficient electrical energy remaining, or that electrical energy storage unit 42 has been removed. Control unit 50 may also determine that electric machine 40 is decoupled from mechanical shaft 34 by monitoring a presence sensor, as discussed above. One example may be a Hall sensor near the mounting position for removable electric machine 40 that detects a presence of a magnet in removable electric machine 40. If control unit 50 detects no magnet, control unit 50 may determine removable electric machine 40 is decoupled from mechanical shaft 34. In response to determining that electrical energy storage unit 42 is not available, or that removable electric machine 40 is decoupled from mechanical shaft 34, control unit 50 may control only engine 25 to drive mechanical shaft 34. For example, without any assistance from electrical machine 40, control unit 50 may control the mechanical power output required by system 10 by controlling engine 25 without regard to monitoring or controlling the mechanical power output from electric machine 40.

For some operations, a hybrid system that relies on supplemental electric motors, such as removable electric machine 40, may be most beneficial for shorter-range missions. For example, using the combined power from a hybrid propulsion system, an aircraft may require less fuel to drive propulsor 30 and may be quieter when compared to an engine alone. In addition, with supplemental electrical power, an aircraft may be able to perform its intended mission by relying on a smaller sized (e.g., dimensions and power) engine 25 thereby further reducing fuel requirements and cost.

For other operations, a hybrid system that relies on supplemental electric motors may be less beneficial for longer-range missions. This is because of energy density considerations for the fuel when compared to electrical energy storage, such as batteries. For a longer range mission, electric machine 40 would only be able to draw a relatively small amount of energy from electrical storage unit 42 to ensure there was enough electrical energy available to complete the mission. Therefore, electric machine 40 would only provide a limited amount of power to drive propulsor 30. This means that electric machine 40 would only be able to provide limited fuel savings, if any. However, removing electrical energy storage unit 42 may reduce the weight, which may reduce the fuel consumption, or allow additional capacity for more fuel and a longer range mission.

Since hybrid power system 10 is an "optionally" hybrid system, an aircraft that relies on hybrid power system 10 can be easily re-configured just prior to a mission depending on the mission requirements. The aircraft can be configured as a hybrid system to take advantages of supplemental electric power for shorter-range missions and be reconfigured as a non-hybrid system to remove the supplemental electric power for longer-range missions. For example, to configure an aircraft, or other vehicle, for a longer-range mission, a maintenance crew may remove electrical energy storage unit 42 to reduce weight. Without the weight of electrical energy storage unit 42, an aircraft may have additional weight capacity available for fuel or cargo. Maintenance crews may be able to fill the aircraft fuel tanks with additional fuel for the longer-range mission. Additionally, for aircraft configured in accordance with techniques of this disclosure, maintenance crews may remove electric machine 40 from each optionally hybrid power system 10 on the aircraft. This converts hybrid power system 10 into a non-hybrid power system configuration and may further reduce weight to allow additional capacity for cargo, fuel or both. Reducing the additional weight of electric machine 40 for longer-range missions may be an advantage over a hybrid power system in which electric machine 40 is not removable.

FIGS. 2A through 2C are conceptual diagrams illustrating portions of an example optionally hybrid power system that enable quick removal of an electric machine, in accordance with one or more techniques of this disclosure. The example of FIGS. 2A through 2C depict optionally hybrid power system as a turbo prop or turbofan that may be used on a fixed wing aircraft. However, the explanation below applies to optionally hybrid power systems used in other applications, such as a marine craft, trains, or any other application that might rely on an optionally hybrid power system as described herein.

FIG. 2A depicts optionally hybrid power system 70 that drives propulsor 30 in the hybrid configuration. Hybrid power system 70 is analogous to hybrid power system 10 from FIG. 1, except FIG. 2A does not show the control unit and removable electrical storage unit shown in FIG. 1. Power system 70 includes engine 25A, electric machine 40A and transmission system 36A, as well as access door 75. FIG. 2B depicts the same components shown in FIG. 2A when hybrid power system 70 is in the non-hybrid configuration.

Engine 25A is analogous to engine 25 from FIG. 1. The example of FIG. 2A depicts engine 25A as a gas turbine engine. Engine 25A may include a low-pressure (LP) mechanical shaft, analogous to mechanical shaft 34 from FIG. 1, but not visible in FIG. 2A or 2B. Engine 25A may drive the LP shaft, which in turn may drive propulsor 30, as described above for FIG. 1.

Electric machine 40A is analogous to electric machine 40 from FIG. 1. Electric machine 40A may include one or more electric motors and one or more electric generators, described in more detail below in FIG. 4. Electric machine 40A may couple to propulsor 30 and engine 25A by mechanically coupling to the LP shaft of engine 25A. As described in FIG. 1, electric machine 40A may couple directly to the LP shaft or through a transmission system, such as transmission system 36A. Electric machine 40A may also electrically couple to a removable energy storage unit, such as energy storage unit 42 shown in FIG. 1. FIGS. 2A and 2B do not show this electrical connection.

Transmission system 36A is analogous to transmission system 36 of FIG. 1. Transmission system 36A may be mounted to engine 25A and mechanically coupled to the LP shaft through a power take off (PTO), a bevel gear or similar mechanical connection. Transmission system 36A may be removable or permanently connected to engine 25A. The example of FIG. 2B depicts transmission system 36A as removable, along with removable electric machine 40A. In other examples, after removing electric machine 40A, transmission system 36A may remain mounted to engine 25A. Transmission system 36A may also be an offtake shaft.

Access door 75 provides an opening into a housing or shroud of hybrid system 70 that gives access to remove or install removable electric machine 40A. Access door 75 may allow a maintenance crew, such as a maintenance ground crew for an aircraft, to quickly and easily remove or install electric machine 40A, without requiring an aircraft to be pulled from service for an extended period.

FIG. 2C depicts an example of electric machine 40A as a sectioned or stackable machine. Electric machine 40A may include one or more motors or generators (e.g. $G/M_1$-$G/M_3$) that may be removed or added as needed. Though not shown in FIGS. 2A-2B, electric machine 40A may also be mounted in line with the mechanical shaft that drives propulsor 30, rather than off to the side, as shown in FIGS. 2A and 2B. For example, electric machine 40A may be mounted in a tail cone section 72 of optionally hybrid power system 70 in line with the mechanical shaft (not shown).

In operation, maintenance ground crews may remove electric machine 40 by working within an opening provided by access door 75, and using tools, to disconnect electric machine 40A from hybrid power system 70. The ground crew may remove just electric machine 40 via the opening provided by access door 75 while leaving a PTO connection and transmission system 36 still attached to the LP shaft of engine 25A. In other examples, hybrid power system 70 may be configured so the ground crew may remove electric machine 40 along with any associated transmission system, such as transmission system 36A via the opening provided by access door 75.

The removable mechanical connection for electric machine 40A may be at transmission system 36A. To decouple electric machine 40A from the mechanical shaft, a mechanic may leave transmission system 36A attached to the mechanical shaft, by disconnecting electric machine 40A from transmission system 36A. In another example, machine 40A and transmission system 36A may be a single unit. A mechanic may decouple transmission system 36A from the mechanical shaft and remove both electric machine 40A and transmission system 36.

Either the mechanical shaft or transmission system 36A may include a PTO. If the PTO is on the mechanical shaft, then electric machine 40A and transmission system 36A may disconnect from the mechanical shaft as one unit. If the PTO is on transmission system 36A, then only removable electric machine 40A may disconnect from the system, leaving transmission system 36A still attached to the mechanical shaft.

Similarly, instead of a PTO, either transmission system 36A or electric machine 40A may include a bevel gear that may couple to the mechanical shaft and be easily decoupled from the mechanical shaft. In this example, transmission system 36A and electric machine 40A may be configured to be decoupled from the mechanical shaft by disconnecting the bevel gear on transmission system 36A from the mechanical shaft. In other words, a maintenance crew may decouple both transmission system 36A and electric machine 40A as one unit from hybrid system 10. In another example, electric machine 40A may include a bevel gear that may be easily decoupled from transmission system 36A. Here, removable electric machine 40A may be configured to be decoupled from hybrid system 70 by disconnecting removable electric machine 40A from transmission system 36A, where transmission system 36A may remain coupled to the mechanical shaft.

A bevel gear, or PTO, are example components that may enable a user of system 70 to easily couple and decouple removable electric machine 40 from optionally hybrid system 10. The mechanical connection between mechanical shaft 34 and removable electric machine 40 may include a PTO, transmission system 36, a bevel gear, or similar mechanical connection.

Machine 40 may transfer energy from electric machine 40 to mechanical shaft 34. In other words, the mechanical connection for electrical machine 40 may transfer power in the opposite direction than the mechanical connection for the accessories. This may require the PTO and gear box 36 to have different features than the PTO and AGB for the accessories. For example, the gear shape and configuration may be similar, but not the same. Also the mechanical connection for electrical machine 40 may need to be stronger and be able to handle larger forces when compared to the AGB and PTO for accessories.

In any of these examples, optionally hybrid power system 10 when configured for non-hybrid operation may remain fully functional without electric machine 40A attached. In other words, any fuel connections, oil circulation, cooling attachments and other elements may be configured so that the non-hybrid configuration may be fully functional to complete a flight mission while configured for longer-range missions.

Maintenance ground crews may quickly and easily remove and install removable electric machine 40A configured according to this disclosure without major maintenance, similar to how line replaceable units (LRUs) may be removed and installed. LRSs and accessories include parts that, although not directly forming part of a core engine, may be necessary to sustain its operation. Examples of LRUs include starters, fuel and hydraulic pumps, actuators, sensors, valves and tubing and entire engines. In contrast, an example of electric machine 40A, configured in accordance with this disclosure, may be a line removable unit (LReU). Unlike an LRU, a maintenance team may remove an LReU from optionally hybrid power system 10, and hybrid power system 10 may remain fully functional. In contrast, removing an LRU fuel pump from a gas turbine engine would likely make the engine inoperable. In accordance with this disclosure, after removing the supplemental electric machine 40A, optionally hybrid power system 10 would continue to operate. Like an LRU, example techniques for removing or installing an LReU electric machine 40A may include a quick access panel and quick disconnect gears discussed above. Example techniques may also include specialized tools and equipment to allow access, assembly and disassembly of LReU components. A line removable electric machine 40A may offer advantages by reducing weight of an aircraft configured for longer range missions when supplemental electric power is less efficient.

Figure 3:
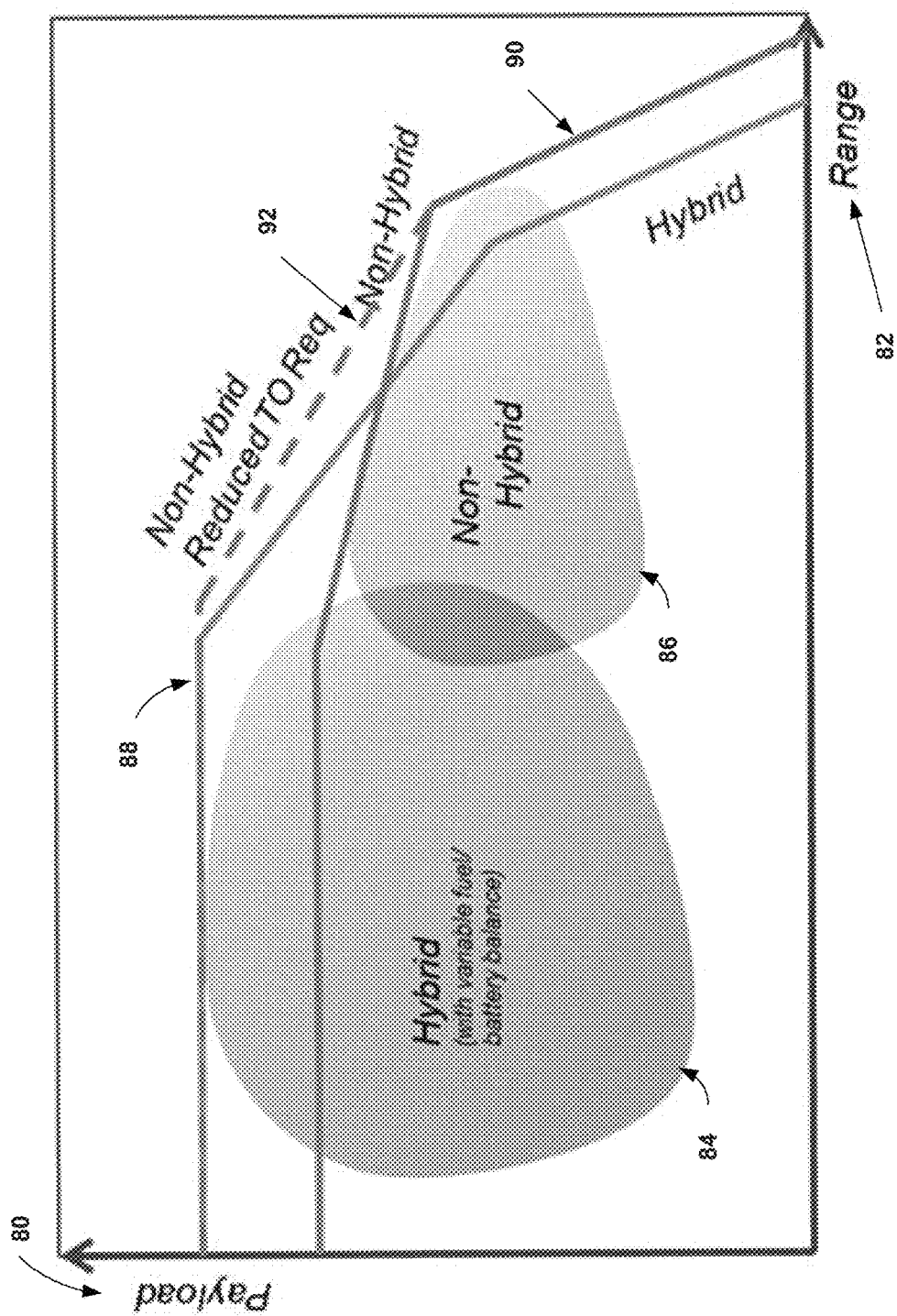
FIG. 3 is a conceptual graph comparing an example hybrid power system to a non-hybrid power system, in accordance with one or more techniques of this disclosure.

FIG. 3 is a conceptual graph comparing an example hybrid power system to a non-hybrid power system, in accordance with one or more techniques of this disclosure. FIG. 3 depicts the payload 80 versus mission range 82 on the axes. Within the graph is the most efficient region for hybrid operation 84 and the most efficient region for non-hybrid operation 86. FIG. 3 also displays a depiction of how payload may decrease with range for a hybrid configuration 88, a similar depiction of how payload may decrease with range for a non-hybrid configuration 90 and the reduced take-off requirement (TO req) for the non-hybrid configuration 92. Payload may decrease with range because of limited propulsion power available. Additional description of FIG. 3 below may include references to FIGS. 1, 2A and 2B as examples.

Hybrid operation region 84 depicts shorter-range missions along range axis 82 with larger payload capability along payload axis 80. The optionally hybrid power system in the hybrid configuration, such as system 70 of FIG. 2A, may include an electric drive systems coupled to the LP shaft (aka mechanical shaft). In the example of FIG. 2A, electric machine 40A may be an electric generator and/or motor included in the propulsion system. An electric drive motor may provide additional thrust to allow an aircraft to take off and operate with a larger cargo payload. A control unit, such as control unit 50 in FIG. 1, may balance the rate of electrical energy use compared to the fuel use to ensure the aircraft retains enough electrical energy to complete the mission, yet minimizes fuel consumption. The hybrid solution may employ the concept of scalable level of battery usage throughout its range of benefits. Energy storage energy density from an electric energy storage unit, such as item 42 shown in FIG. 1, can provide larger improvements for shorter-range missions. The hybrid configuration curve 88 provides another view of hybrid performance and limitations.

Non-hybrid operation region 86 depicts longer-range missions along range axis 82 with a smaller payload when compared to hybrid operation region 84. An aircraft operator may remove the electric drive systems for longer-range missions where the electrical energy storage solutions provide little to no benefits. Removal of the electric drive systems, such as electric machine 40A, may reduce the maximum thrust power available. Therefore this long-range configuration, as shown in FIG. 2B, may limit the payload. Non-hybrid performance curve 90 provides an additional depiction of non-hybrid performance limitations. For example, non-hybrid performance curve 90 shows that a non-hybrid configuration provides little benefit for short range missions because the lower thrust available reduces the payload capacity.

Alternately, removing the additional weight of electric machine 40A in the non-hybrid configuration may reduce the takeoff requirements, as shown by the dashed line indicated by 92 in the graph. For the long range, non-hybrid configuration limited takeoff power may be available, but this may be offset by a relaxation in aircraft takeoff requirements.

An advantage for an aircraft operator with a fleet of aircraft configured with optionally hybrid power systems is the aircraft operator may be able to tailor the fleet hybridization mix with common base equipment. In other words, an aircraft fleet may have several aircraft in the hybrid configuration to be used for shorter-range missions. The remainder of the fleet may be in the non-hybrid configuration for more efficient longer-range missions. An aircraft fleet operator may have the advantage of one set of common spare parts, one type of specialized equipment and a single training program for maintenance crews, as one example. The aircraft fleet operator may select a core engine with a size that provides efficient long-range operation and choose to size the hybridization to target the most efficient shorter-range capabilities. Additionally, the aircraft operator may be able to adjust the size of the hybrid configuration and non-hybrid configuration fleets by adding or removing electric machines as described herein.

One specific example may include an aircraft leasing company, which may maintain a single, standard model, yet be able to satisfy a wide range of customer needs. Similarly, an aircraft manufacturer may have the advantage of being able to standardize on just a few different models by building aircraft with an optionally hybrid power system and prior to delivery finalize the configuration as being hybrid or non-hybrid, depending on the customer selection. Fewer models may provide significant economy for an aircraft manufacturer because of fewer components, fewer certifications required from regulatory bodies, as well as greater standardization in assembly tools, assembly training and inspections and numerous other examples. Manufacturers and operators of other types of vehicles, such as marine craft or ground vehicles, may find similar advantages.

Figure 4:
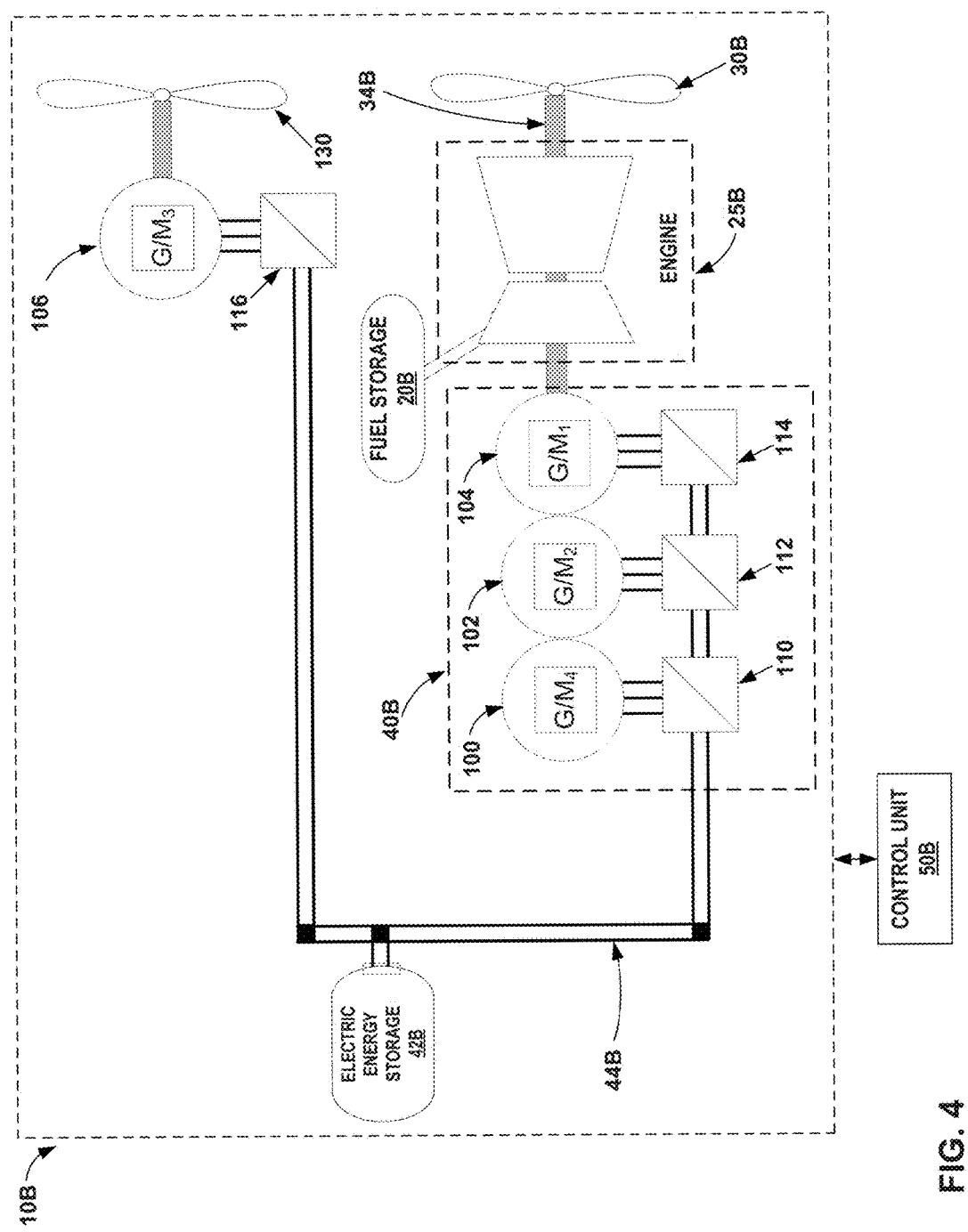
FIG. 4 is a conceptual block diagram illustrating another example hybrid power system that includes one or more electric machines in accordance with one or more techniques of this disclosure.

FIG. 4 is a conceptual block diagram illustrating another example hybrid power system that includes one or more electric machines in accordance with one or more techniques of this disclosure. FIG. 4 illustrates optionally hybrid power system 10B, which may include several electric machines. Several electric machines may be useful to allow for discrete levels of hybridization, for example removing n-of-k machines and drives from the system. Stackable machines may also be mounted in the tail-cone of a gas turbine based hybrid power system. As with optionally hybrid power system 10 shown in FIG. 1, optionally hybrid power system 10B may drive any machinery requiring rotational energy, such as a vehicle or industrial equipment. For ease of description, FIG. 4 will describe system 10B primarily from the perspective of being part of an aircraft.

In the example of FIG. 4, optionally hybrid power system 10B includes fuel storage 20B, engine 25B, propulsor 30B, removable electric machine 40B, removable electrical energy storage unit 42B, electric power transmission connection 44B, and control unit 50B. Hybrid power system 10B may also include a second propulsor 130 mechanically coupled to electric machine 106, which is electrically coupled to power transmission 44B through power conversion and conditioning unit 116 (called conversion unit 116). Conversion unit 116 is analogous to motor drive unit 46 as described by FIG. 1. Similar to FIG. 1, hybrid power system 10B also includes mechanical shaft 34B, which mechanically couples engine 25B to propulsor 30B and to removable electric machine 40B. Hybrid power system 10B further includes control unit 50B which, as designated by the dashed-line surrounding components 20B, 25B, 30B, 34B, 40B, 42B, 44B, 106, 116 and 130 may send and receive information to and from any one or more of the components of hybrid power system 10B. Removable electric machine 40B may include one or more electric machines including generator and/or motor 100 and electric generator and/or motors 102 and 104, which may be mechanically coupled to mechanical shaft 34B.

Hybrid power system 10B is re-configurable and can be configured to operate either in "hybrid mode" and function as a hybrid power system or in "non-hybrid mode" and function as a non-hybrid power system. Additionally, system 10B may be configurable to different levels of hybridization by adding or removing one or more electric machines from electric machine 40B. In some examples, system 10B could act as a power generation system for a distributed propulsion system concept. For a distributed propulsion system concept, the number of electric machines within removable electric machine 40B can be easily configured based on varying aircraft propulsive and non-propulsive loads. A distributed propulsion system may include electrically driven propulsors, such as second propulsor 130, driven by electric machine 106. For example, system 10B may be configured with electrically driven propulsors to allow for high lift during takeoff. During take-off, power generated by engine 25B may generate electricity via one or more components of electric machine 40B. System 10B may distribute this electrical energy to electric machine 106 during take-off operations. During cruise, system 10B may use stored electrical energy to drive propulsors 30B and 130.

In other examples, the same aircraft may be configured such that it does not generate power or drive propulsor 30B with a hybrid drive. In this configuration (not shown in FIG. 4), optionally hybrid system 10B may operate with electric machine 40B removed from system 10B. This may be a scenario in which aircraft is configured to operate long range and the short takeoff field length requirement is relaxed or removed.

As with FIG. 1, mechanical shaft 34B transfers mechanical power produced by engine 25B to propulsor 30B. Mechanical shaft 34B may optionally transfer mechanical power produced by engine 25B to electric machine 40B and may optionally transfer mechanical power produced by electric machine 40B to propulsor 30. Mechanical shaft 34B may mechanically couple to electric machine 40B, or propulsor 30B, via a transmission system (not shown in FIG. 4).

Propulsor 30B, and propulsor 130, may be any device that rotates to perform a function. For example, propulsor 30B may produce mechanical energy onto mechanical shaft 34B by rotating freely due to passing fluid (e.g., wind, water, or other fluid). By rotating, propulsor 30B may spin mechanical shaft 34B which may be coupled to an electric generator to generate electricity or other machinery. Propulsor 30B may receive mechanical energy via mechanical shaft 34 to produce movement. When system 10B is part of an aircraft, propulsor 30B may be a turbofan or a turboprop that utilizes the mechanical power derived from mechanical shaft 34B to provide thrust. For example, as a aircraft descends or decelerates, kinetic energy from rotating propulsor 30B or 130 may be harvested to provide additional power for other aircraft functions. Electric machine 106, configured as a generator, may send electricity through conversion unit 116 to transmission lines 44B to electric energy storage unit 42B, or to other loads not shown in FIG. 4. Propulsor 30B may provide power to other vehicles or machinery as described above for FIG. 1. Propulsor 130 may include the same properties as propulsor 30B, described in more detail below.

Engine 25B is the core power source for hybrid power system 10B. Engine 25B may burn flammable fuel from fuel storage 20B to produce mechanical power to rotate mechanical shaft 34B. Engine 25B may provide mechanical power via mechanical shaft 34B to propulsor 30B and/or electrical machine 40B. The example of FIG. 4 depicts engine 25B as a gas turbine engine and for convenience and clarity, this disclosure will discuss engine 25B as a gas turbine engine on an aircraft. However, in other examples, another type of engine may replace engine 25B as the core power source of hybrid power system 10B.

Electric machine 40B may be one or more machines coupled to mechanical shaft 34B. Electric machine 40B may connect to mechanical shaft 34B directly, or through a transmission system (not shown in FIG. 4). The transmission system may be a multipad transmission system, which may be useful to allow for discrete levels of hybridization (for example, adding or removing n-of-k machines from the system 10B). In the example of FIG. 4, electric machine 40B includes electric generator and/or motors 100, 102 and 104. Generator and/or motors 100, 102 and 104 may be stackable machines, or sectioned machines around the shaft. Generator and/or motor 100 may electrically connect to removable electric energy storage unit 42B through conversion unit 110 and transmission lines 44B. Similarly, generator and/or motors 102 and 104 may electrically connect to removable electric energy storage unit 42B through conversion units 112 and 114, respectively. As described above for FIG. 1, transmission lines 44B and conversion units 110-116 may remain fixed to the aircraft, or may be removable. Conversion units may also be referred to as "power electronics" or "drive units" analogous to drive unit 46 described in FIG. 1. Generator and/or motors 102 and 103 may be AC synchronous, induction, DC permanent magnet or brushless, or any other class of electrical machines that converts electrical power into mechanical power or mechanical power into electrical energy.

Electrical energy storage unit 42B may provide electrical energy to electric machines 40B and 106 through electrical power transmission lines 44B. In examples where electric machine 40B includes a generator, electrical energy storage unit 42B may receive electric energy from electric machine 40B. Electrical power transmission lines 44B may be fully or partially removable, or remain part of the aircraft or other vehicle that uses hybrid power system 10B. As described above for FIG. 1, electrical energy storage unit 42B may completely removable, such as when configuring an aircraft for a longer-range mission. In some examples, removable electrical energy storage unit 42B may be included within or separate from removable electric machine 40B.

Control unit 50B is an example of control unit 50 from FIG. 1. Control unit 50B may receive inputs from and provide control to one or more components of system 10B. Control unit 50B may further receive inputs that indicate the level of hybridization, and types of components, that make up removable electric machine 40B. As one example, in addition to an electrical connection through conversion unit 114 to receive electrical power, electric generator and/or motor 104 may further electrically connect to control unit 50B. Through this electrical connection, control unit 50B may determine the type of electric generator and/or motor, the power available from the generator and/or motor and be able to send commands to control the generator and/or motor as well as receive information on the generator and/or motor function. Control unit 50B may have similar electrical control connections to generator and/or motor 100 and generator and/or motor 102. In another example, control unit 50B may determine the level of hybridization by monitoring any of conversion units 110-116. In other words, instead of connecting directly to electric generator and/or motor 102, control unit 50 may connect to conversion unit 112. Control unit 50B may detect the presence of generator and/or motor 102 through conversion unit 112 as well as control generator and/or motor 102 through conversion unit 112.

In a further example, control unit 50B may monitor transmission lines 44B to determine the amount of energy delivered from or received by electrical energy storage unit 42B. Control unit 50B may similarly receive inputs from electric machine 106, conversion unit 116 and a variety of sensors on engine 25B to determine operating temperature, power delivered, mechanical shaft rotation speed and other information.

In operation, control unit 50B may determine electric machine 40B includes only generator and/or motor 104. In response to determining that removable electric machine 40B only includes electric generator and/or motor 104, control unit 50 may select a first control mode to control removable electric machine 40B. The first control mode may include commands and processes to balance the power to mechanical shaft 30B as delivered from only engine 25B and generator and/or motor 104.

In other examples, control unit 50B may determine whether removable electric machine 40B includes at least one second electric machine component in addition to the first electric machine component. In the example of FIG. 4, control unit 50B may determine that in addition to generator and/or motor 104, electrical machine 40B includes generator and/or motor 102. In response to determining that removable electric 40B machine includes the at least one second electric machine in addition to the first electric machine, control unit 50B may select a second control mode to control combined components in removable electric machine 40B. Depending on which components that control unit 50 detects, then control unit 50 may balance, using the first control mode or the second control mode, engine 25B and removable electric machine 40B to drive mechanical shaft 34 and propulsor 30B.

At the same time, control unit 50B may be configured to indicate, to a propulsion system operator interface, whether the control unit uses the first control mode or the second control mode. Based on the control mode that control unit 50B selects, control unit 50 may provide first information and first control settings based on the first control mode and second information and second control settings based on the second control mode. In other words, using the example where electric machine 40B includes only an electric motor 102, the first control mode may allow the operator a max power output control setting of 85% because of the capability of electric motor 102. The second control mode may allow the operator a max power setting of 95%, because of the additional power available from both electric motor 102 and 104. In an example where electric machine 40B includes electric machines configured as electric motors 102 and 104 as well as an electric generator 100, a third control mode may allow the operator a max power output control setting of 90% because of the additional load on hybrid system 10B from generator 100. Additionally, control unit 50B may provide information to the operator interface in the third control mode that the amount of electrical power available is different than for the first and second control modes.

Another way to describe this is the control settings for each control mode may vary depending on the configuration of electric machine 40B. Control unit 50B may receive different information from the different components of electric machine 40B depending on the degree of hybridization. In the example wherein the propulsion system is an aircraft propulsion system and the propulsion system operator interface is a pilot interface, control unit 50B may provide information to the pilot interface such as the amount of electrical energy remaining, power available to provide thrust for the aircraft as well as other operating parameters within hybrid power system 10B.

As another example, shown in FIG. 4, electric machine 40B may include generator and/or motor 100 and one or more propulsors, e.g. propulsor 130, coupled to electric machine 106, which is distinct from the removable electric machine 40B. In this example control unit 50B may further be configured to drive electric machine 106 based on first electrical power produced by generator 100 during high lift operations, in the example of generator and/or motor 100 configured as a generator. High lift operations may include during take-off, or climbing over obstacles such as mountains. Once the aircraft completes the high lift operations, control unit 50B may drive electric machine 106 based on second electric power produced from electrical energy stored at the removable electrical energy storage unit 42 during cruise operations. The pilot interface, through control unit 50B, may manage the electrical energy stored at removable electrical energy storage unit 42 to ensure there is enough electrical energy to complete the flight, while using power from electric machines 102, 104 and 106 to minimize fuel consumption, in an example where electric machines 102 and 104 are motors. In other words, the control mode for a hybrid configuration may use as much electrical energy as possible to minimize fuel consumption. However, the selected control mode, through control unit 50B may manage the electrical energy consumption rate to ensure that electrical energy storage unit 42 is not depleted until it is no longer needed for the flight.

In other examples, electrical energy storage 42B may or may not be available to drive propulsor 130 using electric machine 106. For example, a maintenance crew may remove electrical energy storage unit 42B. Hybrid power system 10B may then include engine 25B driving electric machine 40B as shown in FIG. 4 with motors 102 and 104 and generator 100. In this example, electrical energy from generator 100 may be the sole source of electric power for electric machines 102-106.

In a further example, optionally hybrid power system 10B may include electrical energy storage unit 42B coupled to conversion unit 116 to drive electric machine 106 and propulsor 130. However, maintenance crews may remove electric machine 40B. Here, engine 25B provides the sole source of power for propulsor 30B and electrical energy storage unit 42B provides the sole electrical power for propulsor 130. In still other examples, propulsor 130 could spin because during cruise operation the airflow passes through propulsor 130 driving electric machine 106. Electric machine 106 may be configured as a generator and produce electrical energy that may be used elsewhere in hybrid power system 10B, or stored in electrical storage unit 42B.

Discrete levels of hybridization may provide advantages, similar to the advantages described above for FIG. 1. For example, the capability to couple one or more electric motors to electric machine 40B may provide the operator of an aircraft fleet additional flexibility to configure aircraft for very short, high cargo missions, medium-range missions and long range missions while still using the common, standardized components. Using standardized components may offer advantages in reduced cost and complexity, yet retain flexibility to configure aircraft, and other vehicles or equipment, for maximum efficiency.

Figure 5:
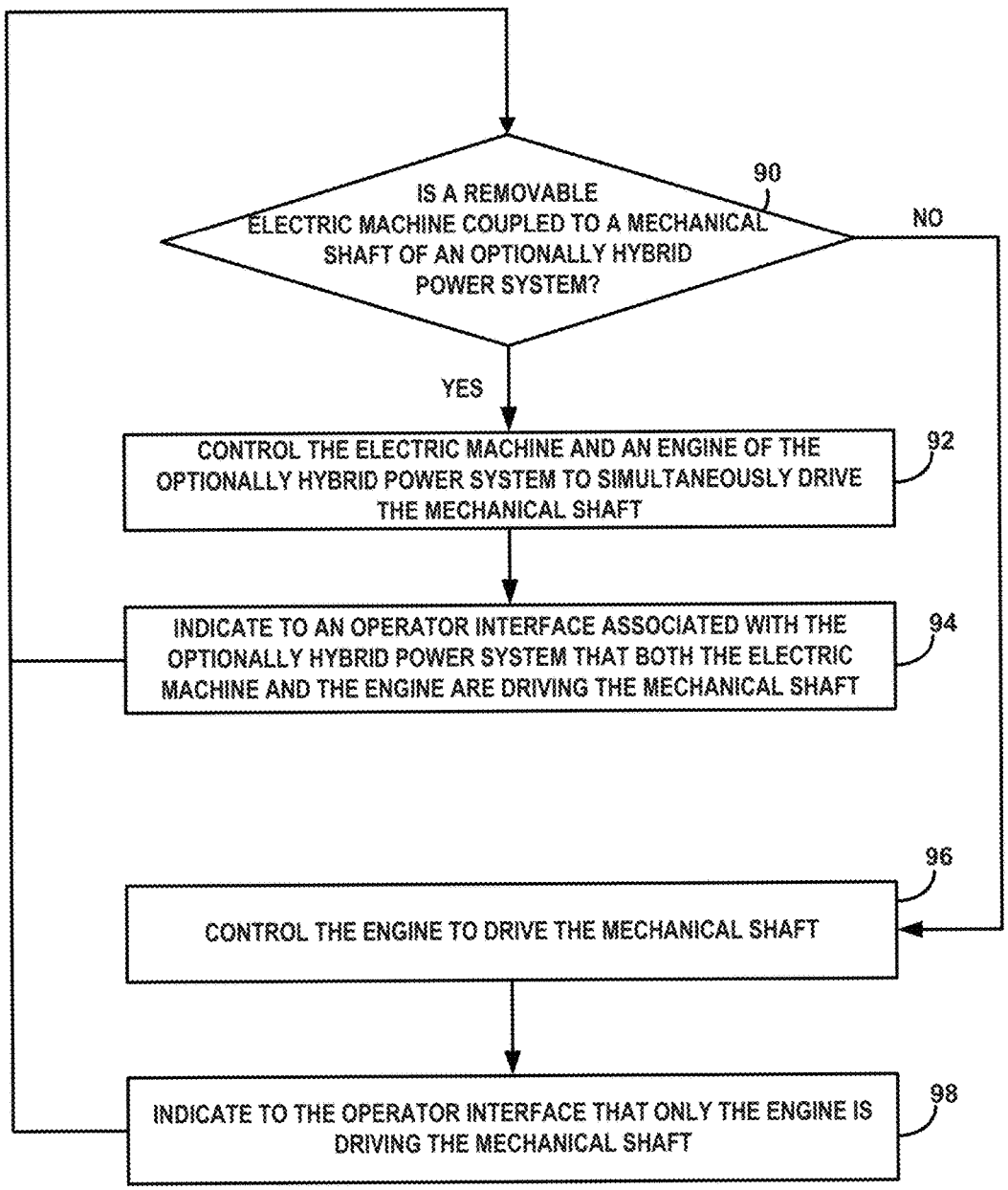
FIG. 5 is a flow chart illustrating example operations performed by a controller of an example hybrid power system, in accordance with this disclosure.

FIG. 5 is a flow chart illustrating example operations performed by a controller of an example hybrid power system, in accordance with this disclosure. FIG. 5 is described in the context of optionally hybrid system 10 shown in FIG. 1.

As shown in FIG. 5, control unit 50 may determine whether removable electric machine 40 is coupled to mechanical shaft 34 of an optionally hybrid power system (90). For example, control unit 50 may monitor electrical contacts, a proximity sensor, such as a Hall sensor, an electrical control connection to electric machine 40 or other techniques to determine whether removable electric machine 40 is coupled to system 10. Control unit 50 may also monitor electrical energy storage unit 42 and a power connection to electric machine 40 to determine whether electric machine 40 is configured to simultaneously drive mechanical shaft 34 in conjunction with engine 25. For example, electric machine 40 may be bolted in place and mechanically coupled to mechanical shaft 34, yet electrical energy storage unit 42 may be depleted. Therefore, though electric machine 40 is coupled to mechanical shaft 34, electric machine 40 may not be configured to drive mechanical shaft 34.

If control unit 50 determines removable electrical machine 40 is coupled to mechanical shaft 34 (90, YES branch), control unit 50 may control electric machine 40 and engine 25 of optionally hybrid power system 10 to simultaneously drive mechanical shaft 34 (92). For example, control unit 50 may execute control operations stored at a memory of control unit 50 to control electric machine 40 in combination with engine 25. By using the combined power from both electric machine 40 and engine 25, an aircraft may require less fuel to drive propulsor 30 and may be quieter when compared to an engine alone.

Control unit 50 may indicate to an operator interface associated with the optionally hybrid power system that both the electric machine and the engine are driving the mechanical shaft (94). For example, control unit 50 may transmit to an operator interface that system 10 is configured to operate in a hybrid configuration. The operator interface may select a control mode based on the hybrid configuration, which may take into account the degree of hybridization of electric machine 40. For example, if electric machine 40 includes both a motor and generator, the operator interface may select a different control mode than if electric machine 40 included one or more electric motors. In other words, the operator interface may take into account the additional load on system 10 from the generator in one mode or the additional power available from two motors by using a different control mode.

If the removable electric machine 40 is not coupled to the mechanical shaft of the optionally hybrid system (90, NO branch), then control unit 50 may control just the engine to drive the mechanical shaft (96). For example, control unit 50 may execute control operations stored at a memory of control unit 50 to engine 25 without controlling electric machine 40. Where electric machine 40 is decoupled from system 10, control unit 50 may operate in a control mode that only receives information from and sends commands to engine 25.

Control unit 50 may indicate to the operator interface that only the engine is driving the mechanical shaft (98). The indication from control unit 50 may cause the propulsion system operator interface to operate in a control mode that only provides the operator control settings and information for engine 25. In the example of an airplane, a cockpit display may show the pilot only the operating temperature and percent power for engine 25. In other words, the cockpit display may not show the percent of energy available in electrical energy storage unit 42, nor any operating parameters for electric machine 40.

Clause 1. A propulsion system comprising: one or more propulsors coupled to a mechanical shaft; an engine configured to drive the mechanical shaft; a removable electric machine that, when coupled to the mechanical shaft, is configured to simultaneously drive the mechanical shaft in conjunction with the engine or extract power from the engine; and a control unit configured to: in response to determining that the removable electric machine is coupled to the mechanical shaft, control the engine and the removable electric machine to drive the mechanical shaft; and in response to determining that the removable electric machine is decoupled from the mechanical shaft, control only the engine to drive the mechanical shaft.

Clause 2. The propulsion system of claim 1, further comprising a removable electrical energy storage unit, wherein the removable electric machine is configured to simultaneously drive the mechanical shaft in conjunction with the engine using electrical energy stored at the removable electrical energy storage unit.

Clause 3. The propulsion system of any of clauses 1-2, wherein the removable electric machine comprises an electric motor configured to drive the mechanical shaft and an electric generator configured to be driven by the mechanical shaft.

Clause 4. The propulsion system of any of clauses 1-3, wherein the removable electrical energy storage unit is included within or separate from the removable electric machine.

Clause 5. The propulsion system of any of clauses 1-4, wherein the engine is a gas turbine engine and the mechanical shaft is a low pressure (LP) shaft.

Clause 6. The propulsion system of any of clauses 1-5, wherein the removable electric machine is configured to be decoupled from the mechanical shaft by disconnecting the removable electric machine from a transmission system coupled to the mechanical shaft.

Clause 7. The propulsion system of any of clauses 1-5, wherein the removable electric machine includes a transmission system, and the removable electric machine is configured to be decoupled from the mechanical shaft by disconnecting the transmission system from the mechanical shaft.

Clause 8. The propulsion system of any of clauses 1-7, wherein the control unit is further configured to: determine whether the removable electric machine includes at least one second electric machine in addition to a first electric machine; in response to determining that the removable electric machine only includes the first electric machine, select a first control mode to control the removable electric machine; in response to determining that the removable electric machine includes the at least one second electric machine in addition to a first electric machine, select a second control mode to control the removable electric machine; and balance, using the first control mode or the second control mode, the engine and the removable electric machine to drive the mechanical shaft.

Clause 9. The propulsion system of clause 8, wherein the control unit is further configured to: indicate, to a propulsion system operator interface, whether the control unit uses the first control mode or the second control mode; and provide first information and first control settings based on the first control mode and second information and second control settings based on the second control mode.

Clause 10. The propulsion system of any of clauses 8-9, wherein the propulsion system is an aircraft propulsion system and wherein: the propulsion system operator interface is a pilot interface; the removable electric machine includes a generator, and the one or more propulsors is coupled to an electric motor distinct from the removable electric machine, and the control unit is further configured to: drive the electric motor based on first electrical power produced by the generator during high lift operations; and drive the electric motor based on second electric power produced from electrical energy stored at the removable electrical energy storage unit during cruise operations.

Clause 11. A method comprising: determining, by a control unit of a propulsion system, whether a removable electric machine of the propulsion system is coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine; in response to determining that the removable electric machine is coupled to the mechanical shaft, controlling, by the control unit, the engine and the removable electric machine to drive the mechanical shaft; and in response to determining that the removable electric machine is decoupled from the mechanical shaft, controlling, by the control unit, only the engine to drive the mechanical shaft.

Clause 12. The method of clause 11, wherein controlling the engine and the removable electric machine to drive the mechanical shaft further comprises managing, by the control unit, electrical energy stored at a removable electrical energy storage unit, wherein the removable electrical energy storage unit couples to the removable electric machine.

Clause 13. The method of any of clauses 11-12, the method further comprising: determining, by the control unit, whether the removable electric machine includes at least one second electric machine in addition to a first electric machine; in response to determining that the removable electric machine only includes the first electric machine, selecting, by the control unit, a first control mode to control the removable electric machine; in response to determining that the removable electric machine includes the at least one second electric machine in addition to a first electric machine, selecting, by the control unit, a second control mode to control the removable electric machine; and balancing, by the control unit, using the first control mode or the second control mode, the engine and the removable electric machine to drive the mechanical shaft.

Clause 14. The method of clause 13, further comprising: indicating, by the control unit, to a propulsion system operator interface, whether the control unit uses the first control mode or the second control mode; and providing, by the control unit, first information and first control settings based on the first control mode and second information and second control settings based on the second control mode.

Clause 15. The method of any of clauses 11-14, wherein the propulsion system is an aircraft propulsion system and wherein: the propulsion system operator interface is a pilot interface; the removable electric machine includes a generator, and the one or more propulsors is coupled to an electric motor distinct from the removable electric machine, the method further comprising: driving, by the control unit, the electric motor based on first electrical power produced by the generator during high lift operations; and driving, by the control unit, the electric motor based on second electric power produced from electrical energy stored at the removable electrical energy storage unit during cruise operations.

Clause 16. The method of any of clauses 11-15, wherein determining whether the removable electric machine coupled to a mechanical shaft includes determining, by the control unit, whether the removable electric machine is coupled to a transmission system that is coupled to the mechanical shaft.

Clause 17. The system of clause 1, further comprising dynamic matching for the mechanical shaft, wherein the dynamic matching ensures system stability.

Clause 18. A system comprising: means for determining, whether a removable electric machine of a propulsion system is coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine; means for determining whether the removable electric machine is coupled to the mechanical shaft; in response to determining that the removable electric machine is coupled to the mechanical shaft, means for controlling the engine and the removable electric machine to drive the mechanical shaft; in response to determining that the removable electric machine is decoupled from the mechanical shaft, means for controlling only the engine to drive the mechanical shaft.

Clause 19. The system of clause 18, wherein the means for controlling the engine and the removable electric machine to drive the mechanical shaft further comprises a means for managing electrical energy stored at an electrical energy storage unit, wherein the removable electrical energy storage unit couples to the removable electric machine.

Clause 20. The system of any of clauses 18-19, further comprising: means for determining whether the removable electric machine includes at least one second electric machine in addition to a first electric machine; in response to determining that the removable electric machine only includes the first electric machine, means for selecting a first control mode to control the first electric machine; in response to determining the removable electric machine includes the at least one second electric machine in addition to the first electric machine, a means for selecting a second control mode to control the removable electric machine; and means for balancing, using the first control mode or the second control mode, the engine and the removable electric machine to drive the mechanical shaft.

Clause 21. The system of claim any of clauses 18-20, further comprising means for indicating to a propulsion system operator interface that the control unit uses the first control mode or the second control mode; and means for providing first information and first control settings based on the first control mode and second information and second control settings based on the second control mode.

Clause 22. The system of any of clauses 18-21, further comprising means for dynamic matching the mechanical shaft to ensure stability of the system.

Various embodiments of the disclosure have been described. These and other embodiments are within the scope of the following claims.

The invention claimed is:

1. A propulsion system comprising:
   one or more propulsors coupled to a mechanical shaft;
   an engine configured to drive the mechanical shaft;
   a removable electric machine that, when installed into the propulsion system and coupled to the mechanical shaft, is configured to simultaneously drive the mechanical shaft in conjunction with the engine or extract power from the engine; and
   a control unit configured to:
     in response to determining that the removable electric machine is coupled to the mechanical shaft, control the engine and the removable electric machine to drive the mechanical shaft; and
     in response to determining that the removable electric machine is decoupled from the mechanical shaft and removed from the propulsion system, control only the engine to drive the mechanical shaft, wherein removing the electric machine from the propulsion system reduces a weight of the propulsion system.

2. The propulsion system of claim 1, further comprising a removable electrical energy storage unit, wherein the removable electric machine is configured to simultaneously drive the mechanical shaft in conjunction with the engine using electrical energy stored at the removable electrical energy storage unit.

3. The propulsion system of claim 2, wherein the removable electrical energy storage unit is included within or separate from the removable electric machine.

4. The propulsion system of claim 2, wherein the propulsion system is a vehicle propulsion system, and wherein removing the electrical energy storage unit reduces the weight of the vehicle.

5. The propulsion system of claim 1, wherein the removable electric machine comprises an electric motor configured to drive the mechanical shaft and an electric generator configured to be driven by the mechanical shaft.

6. The propulsion system of claim 1, wherein the engine is a gas turbine engine and the mechanical shaft is a low pressure (LP) shaft.

7. The propulsion system of claim 1, wherein the removable electric machine is configured to be decoupled from the mechanical shaft and removed from the propulsion system by disconnecting the removable electric machine from a transmission system coupled to the mechanical shaft.

8. The propulsion system of claim 1, wherein the removable electric machine includes a transmission system, and the removable electric machine is configured to be decoupled from the mechanical shaft and removed from the propulsion system by disconnecting the transmission system from the mechanical shaft.

9. The propulsion system of claim 1, further comprising dynamic matching for the mechanical shaft, wherein the dynamic matching ensures system stability.

10. The propulsion system of claim 1, wherein the control unit is further configured to:
   determine whether the removable electric machine includes at least one second electric machine in addition to a first electric machine;
   in response to determining that the removable electric machine only includes the first electric machine, select a first control mode to control the removable electric machine;
   in response to determining that the removable electric machine includes the at least one second electric machine in addition to a first electric machine, select a second control mode to control the removable electric machine; and
   balance, using the first control mode or the second control mode, the engine and the removable electric machine to drive the mechanical shaft.

11. The propulsion system of claim 10, wherein the control unit is further configured to:
   indicate, to a propulsion system operator interface, whether the control unit uses the first control mode or the second control mode; and
   provide first information and first control settings based on the first control mode and second information and second control settings based on the second control mode.

12. The propulsion system of claim 11, wherein the propulsion system is an aircraft propulsion system and wherein:
   the propulsion system operator interface is a pilot interface;
   the removable electric machine includes a generator, and
   the one or more propulsors is coupled to an electric motor distinct from the removable electric machine, and the control unit is further configured to:
      drive the electric motor based on first electrical power produced by the generator during high lift operations; and
      drive the electric motor based on second electric power produced from electrical energy stored at the removable electrical energy storage unit during cruise operations.

13. The propulsion system of claim 1, wherein removing the electric machine configures the propulsion system for a long range mission.

14. The propulsion system of claim 1, wherein the electric machine is easily removed or installed without requiring the propulsion system to be pulled from service for an extended period.

15. A method comprising:
   determining, by a control unit of a propulsion system, whether a removable electric machine of the propulsion system is installed into the propulsion system and coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine;
   in response to determining that the removable electric machine is coupled to the mechanical shaft, controlling, by the control unit, the engine and the removable electric machine to drive the mechanical shaft; and
   in response to determining that the removable electric machine is decoupled from the mechanical shaft and removed from the propulsion system, controlling, by the control unit, only the engine to drive the mechanical shaft, wherein removing the electric machine from the propulsion system reduces a weight of the propulsion system.

16. The method of claim 15, wherein controlling the engine and the removable electric machine to drive the mechanical shaft further comprises managing, by the control unit, electrical energy stored at a removable electrical energy storage unit, wherein the removable electrical energy storage unit couples to the removable electric machine.

17. The method of claim 15, the method further comprising:
   determining, by the control unit, whether the removable electric machine includes at least one second electric machine in addition to a first electric machine;
   in response to determining that the removable electric machine only includes the first electric machine, selecting, by the control unit, a first control mode to control the removable electric machine;
   in response to determining that the removable electric machine includes the at least one second electric machine in addition to a first electric machine, selecting, by the control unit, a second control mode to control the removable electric machine; and
   balancing, by the control unit, using the first control mode or the second control mode, the engine and the removable electric machine to drive the mechanical shaft.

18. The method of claim 17, further comprising:
   indicating, by the control unit, to a propulsion system operator interface, whether the control unit uses the first control mode or the second control mode; and
   providing, by the control unit, first information and first control settings based on the first control mode and second information and second control settings based on the second control mode.

19. The method of claim 18, wherein the propulsion system is an aircraft propulsion system and wherein:
the propulsion system operator interface is a pilot interface,
the removable electric machine includes a generator, and
the one or more propulsors is coupled to an electric motor distinct from the removable electric machine;
the method further comprising:
driving, by the control unit, the electric motor based on first electrical power produced by the generator during high lift operations; and
driving, by the control unit, the electric motor based on second electric power produced from electrical energy stored at the removable electrical energy storage unit during cruise operations.

20. A system comprising:
means for determining whether a removable electric machine of a propulsion system is installed into the propulsion system and coupled to a mechanical shaft of the propulsion system, wherein the propulsion system includes one or more propulsors coupled to the mechanical shaft and an engine configured to drive the mechanical shaft, and wherein the removable electric machine, when coupled to the mechanical shaft, is configured to simultaneously drive the mechanical shaft in conjunction with the engine;
in response to determining that the removable electric machine is coupled to the mechanical shaft, means for controlling the engine and the removable electric machine to drive the mechanical shaft;
in response to determining that the removable electric machine is decoupled from the mechanical shaft and removed from the propulsion system, means for controlling only the engine to drive the mechanical shaft, wherein removing the electric machine from the propulsion system reduces a weight of the propulsion system.

* * * * *